2 Sheets—Sheet 1.
G. T. SHELDON.
Machine for Unhairing and Scouring Hides and Skins.
No. 209,298. Patented Oct. 22, 1878.
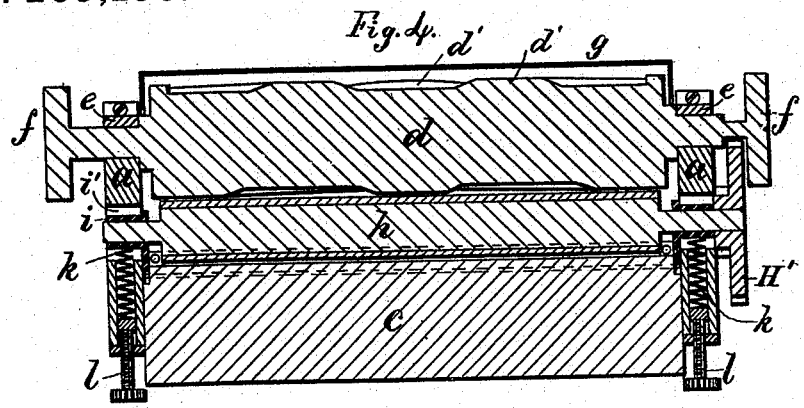
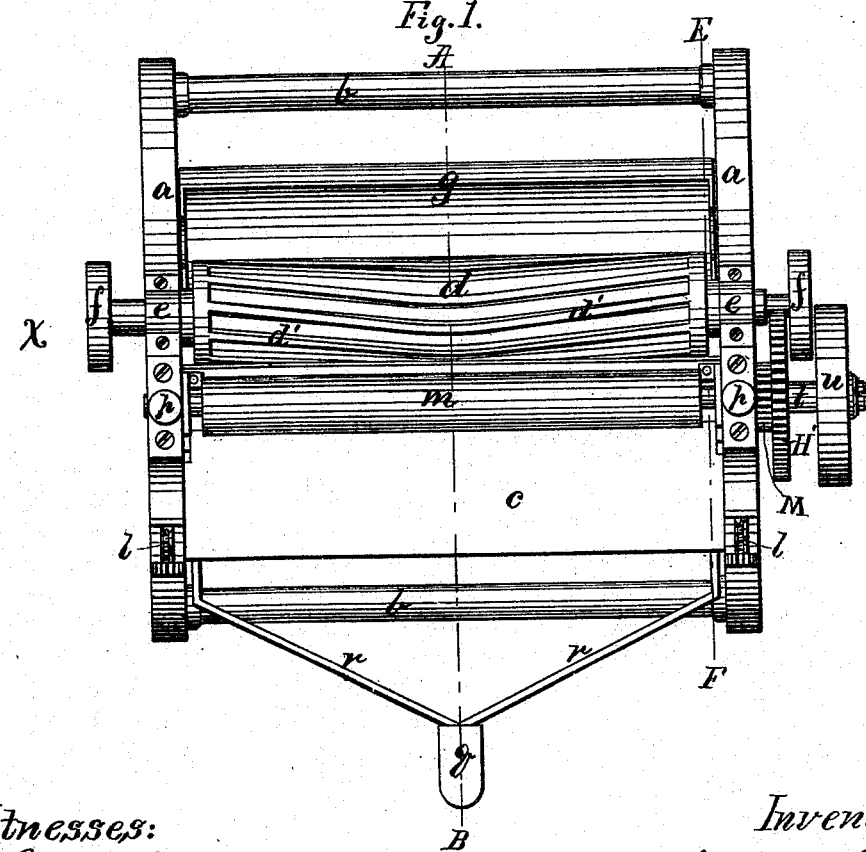
Witnesses:
Henry Chadbourn.
F. Allen.
Inventor:
George T. Sheldon,
by Alvan Andrew
his atty.

2 Sheets—Sheet 2.
G. T. SHELDON.
Machine for Unhairing and Scouring Hides and Skins.
No. 209,298. Patented Oct. 22, 1878.
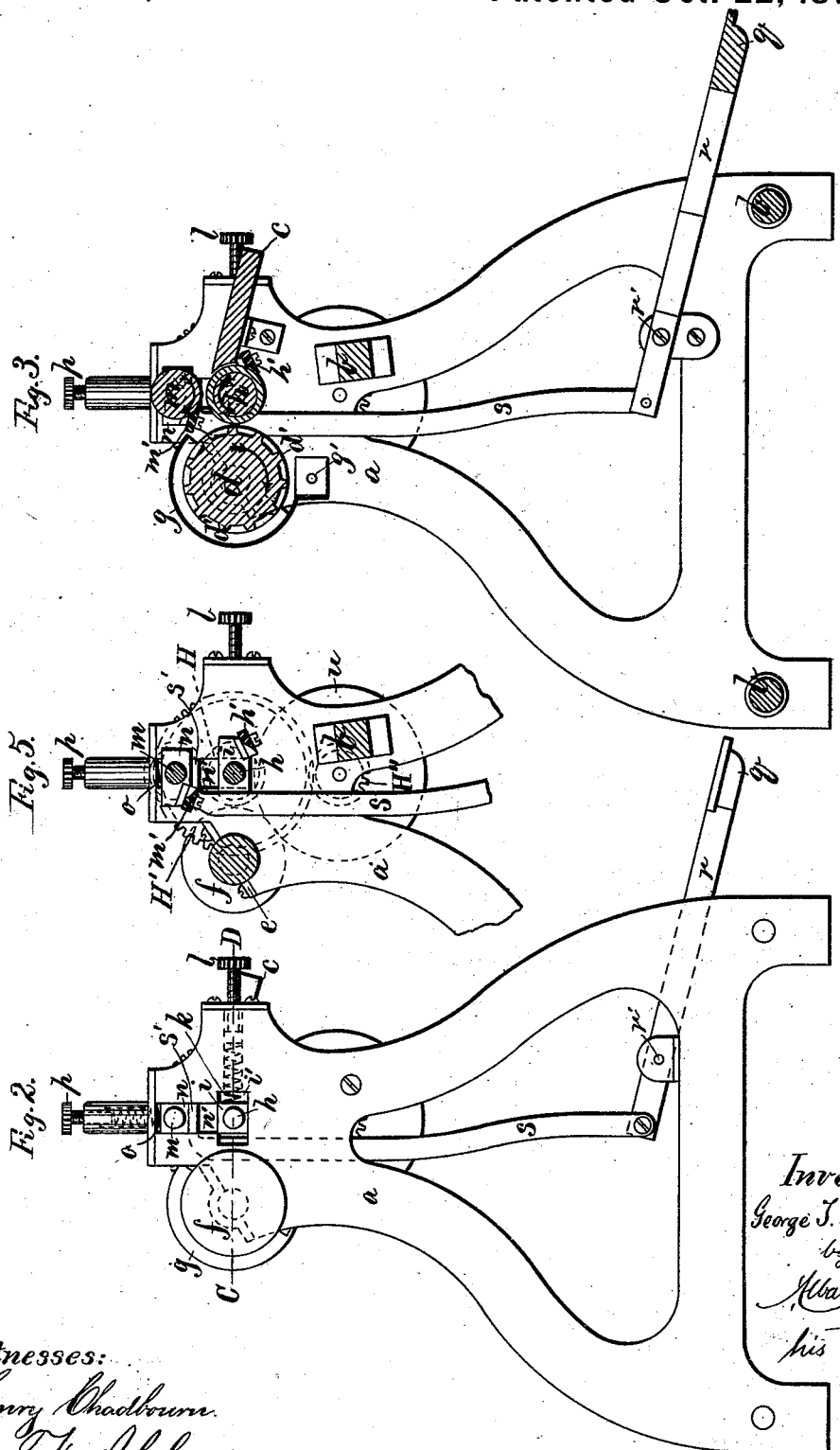
Inventor:
George T. Sheldon.
by
Alban Andrew
his atty.
Witnesses:
Henry Chadbourn.
F. Allen.

UNITED STATES PATENT OFFICE.

GEORGE T. SHELDON, OF CHELMSFORD, MASSACHUSETTS.

IMPROVEMENT IN MACHINES FOR UNHAIRING AND SCOURING HIDES AND SKINS.

Specification forming part of Letters Patent No. 209,298, dated October 22, 1878; application filed August 16, 1878.

*To all whom it may concern:*

Be it known that I, GEORGE T. SHELDON, of Chelmsford, in the county of Middlesex and State of Massachusetts, have invented certain new and useful Improvements in Machines for Unhairing and Scouring Hides and Skins; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention relates to improvements in machines for unhairing and scouring hides and skins; and it consists of a rotary scouring-roll located in stationary bearings in suitable frames, in combination with a rotary yielding pressure and feed roll, that is automatically adjustable to and from the scouring-roll, and a vertically-adjustable rotary feed-roll located directly above the pressure-roll. The hides or skins are fed between the upper rotary feed-roll and lower feed and pressure roll, and they are scoured between the yielding pressure-roll and the rotary scouring-roll without the use of endless aprons or supporting-tables between the feed and scouring rolls, the machine consisting simply of the three rolls, as above set forth.

In combination with the yielding pressure-roll, I employ a scraper or sharp-edged bar, that lies in contact with the said roll on its entire length, and this scraper-bar is firmly secured to the adjustable bearings of the said roll, so that the relative position of the said roll and its scraper always remains the same. This scraper is for the purpose of preventing the leather from being carried completely around the said roll, and thus prevent it from coming in contact with the under side of the feed-table, that is located in front of the machine. A similar scraper is also employed in combination with the upper feed-roll, which scraper is secured by means of suitable screws to the bearings for said roll, by which the relative position of said scraper and its roll is always maintained as the latter is moved to and from the lower pressure-roll over the hide or skin passing between the rollers. This scraper is for the purpose of preventing the leather from winding up on the upper feed-roll, to keep it clean, as well as guiding the hide or skin between the pressure-roll and scouring-roll. These scrapers are removed from the machine when it is used for unhairing and working out hides.

The desired pressure between the upper and lower feed-rolls is obtained by means of spiral springs resting on the upper parts of the bearings on the upper feed-roll, and regulated by means of set-screws. In a similar manner the desired pressure between the pressure-roll and the scouring-roll is obtained by means of spiral springs resting against the front of the bearings for the pressure-roll, and regulated by means of set-screws passing through the frames of the machine.

For the purpose of raising the upper feed-roll above the lower pressure and feed roll, and for the purpose of placing the hide or skin between the rolls at the commencement of the feed, I employ a foot-treadle attached to levers supported in fulcra on the two side frames of the machine. To the extreme ends of said levers a pair of pressure rods or bars are jointed, the upper end of each such bar resting loosely against the under side of each of the bearings for the upper feed-roll, by which arrangements the said roll can be raised, as may be desired, simply by pressure upon the foot-treadle in front of the machine. When the operator relieves the pressure on the said treadle, the upper roll is automatically forced downward against the skin or hide resting on the lower roll by means of the spiral springs heretofore mentioned.

On the accompanying drawings, Figure 1 represents a plan view of the machine. Fig. 2 represents a side elevation, seen from $x$ in Fig. 1. Fig. 3 represents a vertical section on the line A B, shown in Fig. 1. Fig. 4 represents a horizontal section on the line C D, shown in Fig. 2; and Fig. 5 represents a sectional view on the line E F, shown in Fig. 1.

Similar letters refer to similar parts wherever they occur on the drawings.

*a a* are the frames, secured together by means of the stays or braces *b b b*, as usual. *c* is the work-plate, upon which the hides or skins are supported during the progress of the work. *d* is the metallic scouring-roll, with its ridges or projections $d'\ d'$, as usual, which roll is journaled in stationary bearings $e\ e$. To the shaft of the scouring-roll $d$ are secured the pulleys $f\ f$, to which the required speed is imparted from belts, in the usual manner. $g$ is a shield, hinged at $g'\ g'$, and, when turned up in position, it surrounds the exposed part of the scouring-roll $d$, so as to prevent the hairs, dust, and scourings from being blown into the operating-room.

$h$ is the elastic pressure and feed roll, journaled in bearings $i\ i$, that are adjustable horizontally in the lateral slots or guides $i'\ i'$ in the frames $a\ a$. $k\ k$ are the spiral springs, resting against the forward ends of the bearings $i\ i$, and regulated by means of the set-screws $l\ l$, for the purpose of obtaining the desired yielding pressure of the roller $h$ against the skin or hide that is drawn forward between the rollers $h$ and $d$.

$m$ is the upper feed-roll, located in adjustable bearings $n\ n$ above the pressure and feed roller $h$, as shown. The bearings $n\ n$ are adjustable up and down in the slots or guides $n'\ n'$ in the upper ends of the frames $a\ a$. The feed-roll $m$ is made yielding by means of the spiral springs $o\ o$ and set-screws $p\ p$, for the purpose of obtaining the desired pressure between the feed-rollers and the skin or hide between them during the operation of the machine.

$m'$ is the scraper for the roll $m$, which scraper is secured, by means of screws or otherwise, to the bearings $n\ n$, for the purpose set forth. $h'$ is a similar scraper for the roll $h$, which scraper is secured to the bearings $i\ i$ for the said roll, as and for the purpose set forth.

$q$ is the foot-treadle, extending from the middle of the machine to its sides as arms $r\ r$, hung in stationary fulcra $r'\ r'$ in the frames $a\ a$, as shown. To the inner ends of the arms or levers $r\ r$ are jointed, respectively, the upward-extending rods $s\ s$, that terminate below the adjustable bearings $n\ n$ as plates or lifters $s'\ s'$, for the purpose of being able to raise the roll $m$ from contact with the pressure-roll $h$ when a hide or skin is placed between said feed-rollers $h$ and $m$.

The rollers $h$ and $m$ are set in rotary motion in the direction indicated by the arrows by means of pinions H and M, the former secured to the shaft for the roll $h$ and the latter to the shaft for the roll $m$. H' is a spur-gear, also secured to the shaft for the roll $h$, which gear engages with a pinion, H'', on the shaft $t$. $u$ is a pulley, by means of which a rotary motion is imparted to the pinion H'', in the usual manner.

Having thus fully described the nature, construction, and operation of my invention, I wish to secure by Letters Patent and claim—

1. In combination with the scouring-roll $d$, the yielding feed and pressure roll $h$, adjusted laterally to and from the scouring-roll $d$, and the feed-roll $m$, adjusted to and from the laterally-adjustable feed and pressure roll $h$, substantially as and for the purpose set forth and described.

2. In combination with the scouring-roll $d$, the laterally-adjustable roller $h$, with its scraper $h'$, secured to the bearings $i\ i$, and the vertically-adjustable roller $m$, with its scraper $m'$, secured to the bearings $n\ n$, substantially as and for the purpose set forth.

3. In combination with the scouring-roll $d$ and the laterally-adjustable feed and pressure roll $h$, of the vertically-adjustable feed-roll $m$, its springs $o\ o$, adjustable screws $p\ p$, and the treadle mechanism $q\ r\ r\ s\ s\ s'\ s'$, as and for the purpose set forth.

4. In combination, the scouring-roll $d$, the laterally-adjustable feed and pressure roll $h$, its laterally-adjustable bearings $i\ i$, springs $k\ k$, and screws $l\ l$, and the vertically-adjustable feed-roll $m$, its adjustable bearings $n\ n$, springs $o\ o$, and screws $p\ p$, as and for the purpose set forth.

In testimony that I claim the foregoing as my own invention I have affixed my signature in presence of two witnesses.

GEORGE T. SHELDON.

Witnesses:
ALBAN ANDRÉN,
HENRY CHADBOURN.